United States Patent
Woie et al.

(10) Patent No.: US 12,247,478 B2
(45) Date of Patent: Mar. 11, 2025

(54) MANAGEMENT OF SUBSEA WELLHEAD STRESSES

(71) Applicant: CONOCOPHILLIPS COMPANY, Houston, TX (US)

(72) Inventors: Rune Woie, Tananger (NO); Harald Nevoey, Tananger (NO)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 17/198,819

(22) Filed: Mar. 11, 2021

(65) Prior Publication Data

US 2021/0285317 A1    Sep. 16, 2021

Related U.S. Application Data

(60) Provisional application No. 62/988,165, filed on Mar. 11, 2020.

(51) Int. Cl.
*E21B 47/007* (2012.01)
*E21B 33/035* (2006.01)
(Continued)

(52) U.S. Cl.
CPC .......... *E21B 47/007* (2020.05); *E21B 33/035* (2013.01); *E21B 47/12* (2013.01);
(Continued)

(58) Field of Classification Search
CPC ...... E21B 47/007; E21B 33/035; E21B 47/12; E21B 2200/20; E21B 47/00; G01B 7/16; G01L 1/00
See application file for complete search history.

(56) References Cited

U.S. PATENT DOCUMENTS 7,027,968 B2 * 4/2006 Choe ................... E21B 41/0007
                                                            702/6
2001/0027865 A1 * 10/2001 Wester ..................... E21B 47/06
                                                         166/250.07
(Continued)

FOREIGN PATENT DOCUMENTS

GB    2402478 A    12/2004
GB    2475409 A *  5/2011  ............ E21B 33/03
(Continued)

OTHER PUBLICATIONS

Machine translaton of NO20101779A1 (Year: 2012).*
(Continued)

*Primary Examiner* — Lee E Rodak
*Assistant Examiner* — Sangkyung Lee
(74) *Attorney, Agent, or Firm* — CONOCOPHILLIPS COMPANY

(57) ABSTRACT

The invention relates to a method and system for monitoring strain data on a subsea wellhead and associated tubing especially during a drilling or completion operation when the wellhead is connected via a riser to a drilling rig. The bending stresses on the wellhead assembly can be modelled and monitored, based on strain data from strain gauges attached to the conductor, surface casing and possibly also inner tubing. The strain gauges are located where maximum bending stresses occur, at around seafloor level. Data from the strain gauges is transmitted by radio to a receiver unit on the template, from which it may either be transmitted to the surface or stored and retrieved by divers or subsea vehicles.

16 Claims, 2 Drawing Sheets

(51) Int. Cl.
  *E21B 47/12* (2012.01)
  *G01B 7/16* (2006.01)
  *G01L 1/00* (2006.01)
(52) U.S. Cl.
  CPC ............ *E21B 2200/20* (2020.05); *G01B 7/16* (2013.01); *G01L 1/00* (2013.01)

(56) References Cited

U.S. PATENT DOCUMENTS

| | | | |
|---|---|---|---|
| 2005/0100414 A1 | 5/2005 | Salama | |
| 2005/0103123 A1 | 5/2005 | Newman | |
| 2007/0187109 A1* | 8/2007 | Millheim | E21B 17/012 166/367 |
| 2015/0041119 A1 | 2/2015 | Plotnikov et al. | |
| 2016/0196699 A1* | 7/2016 | Chitty | G07C 5/006 701/31.7 |
| 2017/0114625 A1* | 4/2017 | Norris | E21B 47/00 |
| 2018/0094519 A1 | 4/2018 | Stephens et al. | |
| 2018/0106140 A1 | 4/2018 | Barrilleaux et al. | |
| 2018/0347135 A1* | 12/2018 | Kannegaard | E21B 19/002 |

FOREIGN PATENT DOCUMENTS

| | | | |
|---|---|---|---|
| GB | 2450409 B | 9/2012 | |
| NO | 20101779 A1 * | 6/2012 | ............ E21B 47/00 |
| WO | WO-2018096160 A1 * | 5/2018 | |

OTHER PUBLICATIONS

International Search Report and Written Opinion for PCT/US2021/021927 mailed May 27, 2021; 11 pgs.

Myhre, Erling, et al—"Successful Real Time Instrumentation of the Conductor and Surface Casing of an Exploration Subsea Well in the North See to Measure the Actual Loads Experienced During Drilling Operations", 2015, Offshore Technology Conference, Houston, TX May 4-7, 2015, OTC-25770-MS; 16 pgs.

King, G.W., et al—"The Instrumentation of the Conductor of a Subsea Well in the North Sea to Measure the Installed Conditions and Behavior Under Load", 1995, SPE Drilling & Completion; pp. 265-270; 6 pgs.

Rimmer, A., et al—"Structural Response Monitoring of Huntington HP Drilling and Completion Riser", 2013, SPE International, SPE 166589; pp. 1-16; 16 pgs.

* cited by examiner

MANAGEMENT OF SUBSEA WELLHEAD STRESSES

CROSS-REFERENCE TO RELATED APPLICATIONS

This application is a non-provisional application which claims benefit under 35 USC § 119(e) to U.S. Provisional Application Ser. No. 62/988,165 filed Mar. 11, 2020 entitled "MANAGEMENT OF SUBSEA WELLHEAD STRESSES," which is incorporated herein in its entirety.

FIELD OF THE INVENTION

This invention relates to the management of stresses in subsea wellheads.

BACKGROUND OF THE INVENTION

Wellhead stress and accumulated fatigue damage is a key concern for drilling subsea wells drilled with Mobile Drilling Unit (MODU). Fatigue failure can result in a broken wellhead and thereby no control of pressure in the well. A broken wellhead can mean the capability to enter the well mechanically is lost. This is a concern for the well lifetime, for the initial drilling, later possible sidetrack of the well and finally of the plug and abandonment of the whilst using a MODU.

Stresses at a subsea wellhead can be created throughout the life cycle of the well, but typically the most severe load conditions occur when a marine riser/BOP is connected to the wellhead, and the movement of the MODU and the riser system transfers loads into the wellhead system and associated strings until it is dissipated/absorbed by the external soil support.

The current best approach for addressing this problem is to perform thorough wellhead/conductor analysis in the design phase of the well, and to select components that are suited for the predicted load conditions. The challenge is that a lot of assumptions have to be made about the weather conditions, the MODU and riser/BOP movements, the mechanical stiffness of the system, the soil strength and so on. Often conservatism in the modelling leads to an unnecessary over-design of components, but in some cases the opposite is the outcome. Instruments are available to monitor the riser/BOP movement in an operational phase, but fairly complex and uncertain calculations have to be made to convert these measurements to stress in components deeper in the well in order to evaluate and monitor actual accumulated fatigue damage. A simplistic supplement to this is monitoring and using Metocean data only to determine wellhead fatigue lifetime. This may be the selected approach as the calculation method has large uncertainties regarding pipe lock-in/connections, cement load/arrest and transfer between pipes and formation, and the strength of formation immediately below seafloor.

GB2402478A describes the use of optical fibres running the length of casing to detect damage to the casing due to stresses in the formation.

GB2450409B (equivalent to NO341712B1) describes the use of gauges to help control the deliberately applied tension in a production riser/casing running between casing hanger of a wellhead on a platform and a subsea wellhead.

BRIEF SUMMARY OF THE DISCLOSURE

To mitigate for this, the invention seeks to make more direct measurements at fatigue hot spot locations at or immediately below seafloor to remove modelling uncertainty, and to measure the actual stress and thus fatigue of the wellhead or the pipe joints immediately below the conductor housing, the wellhead housing or possibly below inner pipes such as casing and production tubing immediately below the wellhead. According to the invention, strain gauges are fitted to the conductor pipe and surface casing in the region of the well head. Based on signals from the strain gauges, event analysis and calculations of the stress and accumulated fatigue damage are conducted, allowing the operator to define appropriate operating envelopes for the MODU and riser tension, thereby ensuring that design limits are not exceeded and maintaining well integrity throughout well lifetime.

The invention more particularly includes a method for monitoring stress in subsea wellhead assembly comprising a wellhead and associated tubing, the associated tubing including conductor and surface casing, the method comprising:

(a) Fitting at least three strain gauges (such as between 3 and 50, e.g. between 3 and 20 strain gauges) to each of the conductor and surface casing adjacent or below seafloor level, such as between 5 m above seafloor level and 30 m below seafloor level;

(b) Gathering strain data, e.g. during a drilling, completion, stimulation or workover operation, from the strain gauges over a period of time;

(c) Monitoring the data over a period of time (i) to model stresses, such as bending stresses, on the wellhead assembly and (ii) to determine the number and magnitude of stress cycles, such as bending stress cycles, of the wellhead assembly over the period of time; then performing step (d), step (e) or both steps (d) and (e);

(d) Using information from step (c), assessing the risk of or determining actual over-stressing of the wellhead assembly or parts thereof;

(e) Using information from step (c), assessing the risk of accumulated fatigue failure of the wellhead assembly or parts thereof at a given time.

Optionally, prior to step (b), one or more further strain gauges are fitted adjacent or immediately below the top of a wellhead housing of the wellhead, on conductor or other casing.

Optionally, prior to step (b), at least one strain gauge is fitted to a further tubing string inside the surface casing.

A non-intrusive data transmission system may be provided to transmit, e.g. by radio, magnetic, electromagnetic, induction or acoustic, data from strain gauges, such that no wire passes through any well tubing or seal. In this case, a data receiving unit may be provided adjacent the wellhead, e.g. mounted to a subsea template in which the wellhead is installed, which may receive data from one or more of the strain gauges and either (i) transmit it to the surface or (ii) store it in a data storage facility from which it is periodically downloaded by a diver or remote operated subsea vehicle. The non-intrusive data transmission system may be powered by electric batteries, by induction or by a combination of batteries and induction.

At least some of the measured strain data may be caused by movement of a riser or blowout preventer (BOP) connected to the wellhead, in which case the riser may be connected between the wellhead and a jack up rig or floating rig, e.g. a drilling rig.

The method may be computer implemented, whereby monitoring and modelling in step (c), (d) and/or (e) is performed with the aid of a suitably programmed computer.

The invention also includes a wellhead assembly installed on a seafloor or in a template structure, the assembly including a conductor housing, conductor, wellhead and surface casing, the assembly further including:

a. A strain gauge, optionally at least three strain gauges, attached to each of the conductor and surface casing adjacent or below seafloor level, such as between 5 m above seafloor level and 30 m below seafloor;

b. a non-intrusive data transmission system to transmit, e.g. by radio, magnetic, electromagnetic, induction or acoustic, data from strain gauges, such that no wire passes through any well tubing or seal;

c. a data-receiving unit adjacent the wellhead, e.g. mounted to a subsea template in which the wellhead is installed, arranged to receive data from one or more of the strain gauges and to either (i) transmit the data to the surface or (ii) store the data in a data storage facility from which it is downloadable by a diver, remotely operated subsea vehicle, or surface vessel.

Optionally, one or more further strain gauges are fitted adjacent or immediately below the top of a wellhead housing of the wellhead, on conductor or other casing.

At least one strain gauge may be fitted to a further tubing string inside the surface casing. A riser or blowout preventer (BOP) may be connected to the wellhead. A riser may be connected between the wellhead and a jack up rig or floating rig, e.g. a drilling rig.

The wellhead assembly may comprise all or part of a computer implemented system for monitoring strain data and for modelling stresses, such as bending stresses or accumulated fatigue damage, on the wellhead assembly.

The non-intrusive data transmission system may be powered by electric batteries, by induction, or by a combination of batteries and induction.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead, these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

While preferred examples of the present inventive concept have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein can be employed in practicing the disclosure. It is intended that the following claims define the scope of the disclosure and that methods and structures within the scope of these claims and their equivalents be covered thereby.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
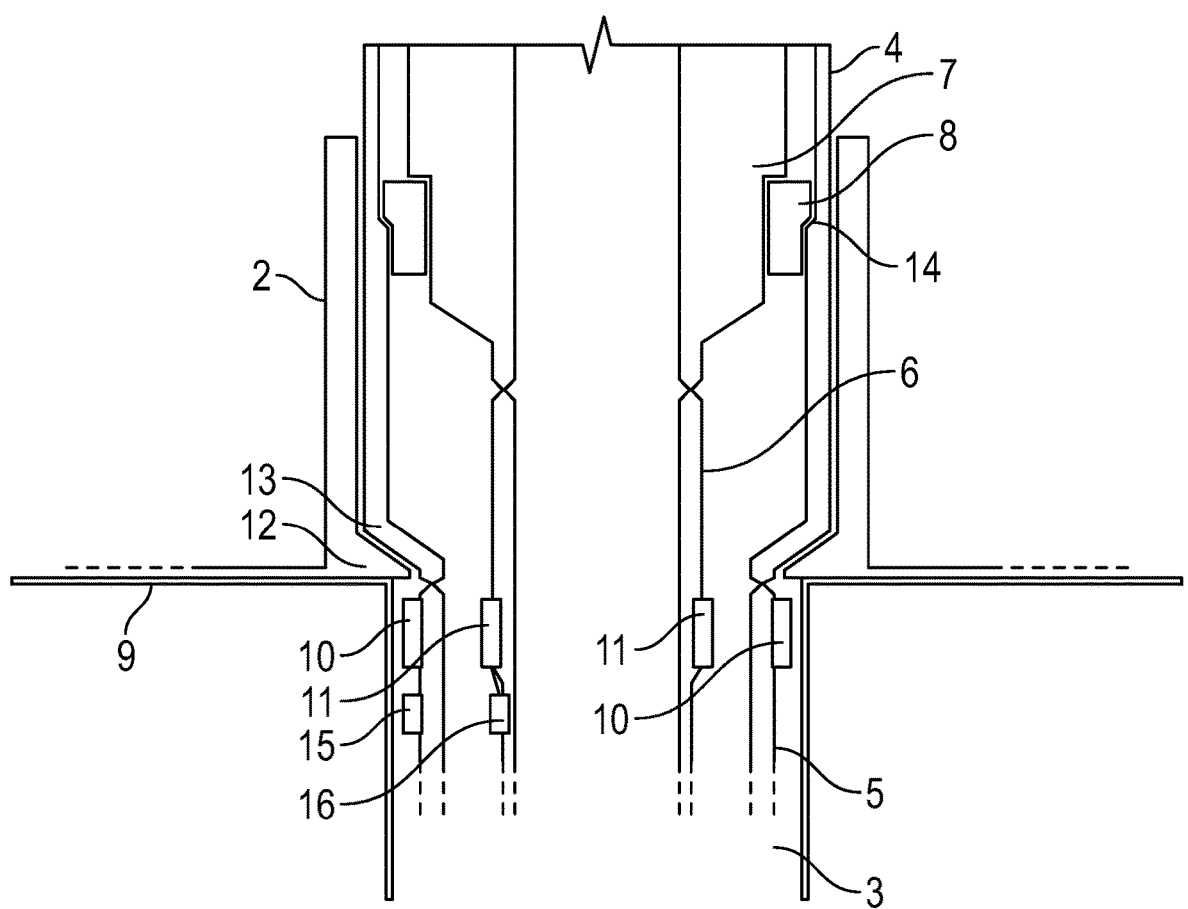
FIG. 1 is a schematic section through portion of a subsea template in which is installed conductor housing and wellhead housing with associated conductor and surface casing, according to the invention.

FIG. 1 shows a portion of a subsea template including a template slot 2. The template rests on the seafloor 9 and the slot 2 is a large circular aperture in the base of the template, with an upstanding cylindrical support structure. Note that the invention is also applicable for free-standing wells. In this case there is no template structure 2 and the seafloor 9 is typically 1-2 metres lower with reference to the conductor housing 4.

A bore hole 3 has been drilled through the template into the seafloor.

A conductor housing 4 is installed in the template slot 2. The conductor housing is a cylindrical steel member of diameter slightly less than the slot 2. The conductor housing 4 may have an outer diameter of about 30-42 inches (76-107 cm). It is supported in the template slot 2 by means of cooperating shoulder formations 12, 13 on the template slot and conductor housing, respectively. In the case of a free-standing well, the conductor housing 4 is supported by cement which is placed between the conductor pipe 5 and borehole wall 3 up to a short distance from the seafloor 9.

Welded to the conductor housing 4 are conductor tubulars, or just "conductor" 5. Conductor 5 can have an outer diameter of about 26 to 36 inches (66 to 91 cm). Conductor 5 extends downwardly into the wellbore, to a depth of 40 to 230 feet (12 to 70 metres) depending on local soil conditions, at which point the wellbore narrows.

Installed in the conductor housing 4 is a wellhead housing 7. The wellhead housing 7 can engage and align within the conductor housing 4 in different ways, one of which is via a mounting ring 8. The mounting ring 8 can be engaged and/or supported on an internal shoulder 14 of the conductor housing 4. Various rigid lock-down systems may be used to ensure appropriate load transfer between the outer and inner strings.

Surface casing 6 is welded to the lower end of the high-pressure wellhead housing 7. Surface casing is a narrower steel tubular which extends downwardly beyond the end of the conductor 5. Surface casing 6 can be approximately 18 to 24 inches in diameter (approximately 46 to 61 cm).

In an alternative structure, which is the subject of patent application No. 62/815,231, the conductor tubular may not be used, and the upper, larger diameter, portion of the wellbore can be avoided. Instead, the template slot 2 is sized and configured, equipped with conductor housing 4 without the conductor pipe 5, to receive the high-pressure housing 7 and surface casing 6 directly at the level of the seafloor. The invention applies equally to this alternative structure. The contents of 62/815,231 are incorporated by reference.

Strain gauges 11 are mounted circumferentially around the outside of the surface casing 6, with associated radio transmitter or transmitters 15/16. The gauges are fitted immediately below the wellhead on the surface casing 6 in areas that are not sealing areas. A centralizing device may be used to protect the gauges/transmitters from being scraped/wiped off during landing of the wellhead 7 in the conductor housing 4.

In this example, 4 strain gauges are used, but the number could be anything from 3 gauges to whatever number is required to get the required circumferential coverage, for example 10 or 20, to truly measure/calculate fatigue. For simplified one dimensional stress monitoring/measurement, one or two strain gauges with a transmitter to send data to an external receiver can be installed.

The strain gauges are a sensor type that measures dynamic strain with high resolution and accuracy, typically 1 microstrain at 10 Hz or better. Such gauges are available on the open market and are well known devices.

The strain gauges are preferably oriented to give full circumferential coverage in order to calculate accumulated fatigue damage in the worst direction.

The gauges are arranged to measure the relative change in length (deformation) caused by a deforming force, thereby allowing the calculation of pipe stress, associated bending moment and the frequency (cycle) of the forces acting on surface casing just below the wellhead. From this, maximum stress and accumulated fatigue damage can be derived for critical fatigue hot spots, which typically are the welds between the forged steel wellhead components and the extension tubulars.

These types of strain often result from the movement of marine riser/BOP that vessels utilize to connect onto the well. The riser/BOP movement is caused by environmental forces that act on the vessel and/or riser and are also influenced by the station-keeping ability of the vessel in use. This movement is translated into a force where the riser/BOP is connected to the high-pressure wellhead housing 7, which again is transferred to the well tubulars until the force is dissipated/absorbed by the external soil support.

Since the strain gauges are located just below seafloor level, they are in immediate proximity to a seabed receiver 19 that is placed on or adjacent the template structure. For free-standing wells, the receiver can be mounted on a bracket installed on the outer conductor. The receiver uses induction power or similar technology to wirelessly communicate with the gauge signal transmitter 16 to read strain data. The subsea receiver can comprise at minimum one or more data receiver(s), a storage memory, and a data communication/transmission system from seafloor to the surface through wire, acoustic technology or with ROV retrievable memory bank.

Once at the surface, strain data can be evaluated and analyzed to determine wellhead system performance under actual loading conditions (real-time or with a latency depending on data transfer technology used), and operational envelopes can be adjusted to suit.

Similarly, strain gauges 10 are also applied to the exterior surface of the conductor 5, at a level just below the conductor housing 4, evenly spaced around the circumference of the conductor 5, and applied in the same way as to the surface casing. Additional gauges may be applied to additional pipe members immediately below the wellhead to evaluate maximum stress and accumulated fatigue damage in hot spots on the conductor pipe.

The measurement and data transmission is achieved by using combination or only batteries or induced power. Induced power applied on the template well slot, or the template well slot tail pipe allows a non-intrusive method to communicate and power sensors and achieve two-way communication of data, as well transmitting and powering up sensors transmission system for additional inner strings is wanted. Direct wired communication and powers is not possible through the conductor housing nor the wellhead housing, thus induction from the template slot inwards to the will enable non-intrusive powering and communication of collected data for the entire well life. Batteries carried will have a limited time window of operation, but may be satisfactory for some short duration wells, example exploration wells. Batteries will then power sensors and the transmission that may be acoustic or electromagnetic across the various pipes to a receiver/antenna placed on the template/well slot. se outer strain gauges may or may not utilize wireless data transfer technology depending on the physical arrangement.

Figure 2:
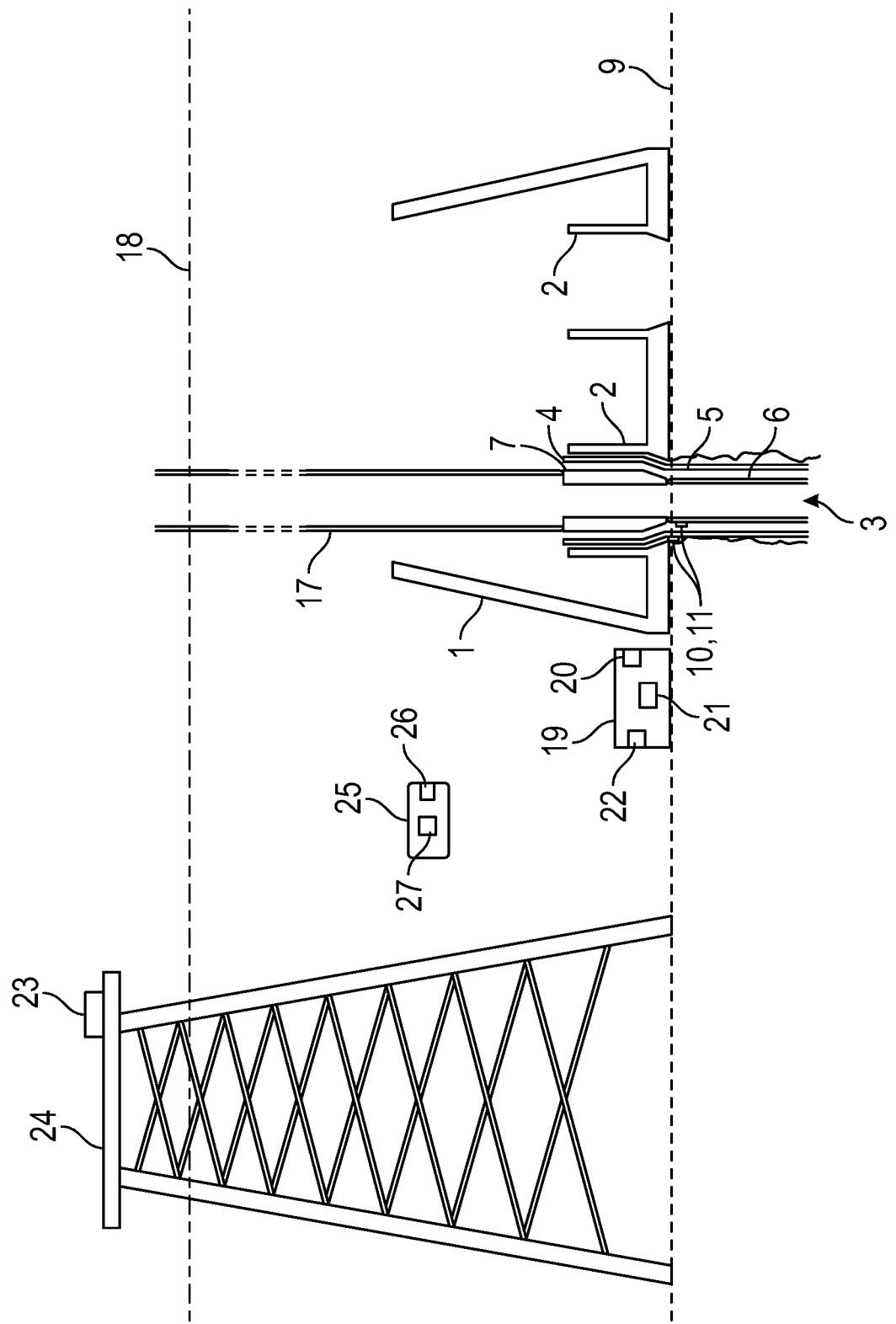
FIG. 2 is a schematic showing a subsea template including conductor housing and wellhead housing, together with data receiver/transmitter, in accordance with the invention, and also an associated platform (not to scale).

FIG. 2 shows in highly schematic form the invention installed on the seafloor 9. Where they show similar components, the same reference numerals are used in FIG. 1 and FIG. 2.

A subsea template 1 has a number of slots 2 formed in it, two of which are shown in FIG. 2. For clarity, only one of the slots 2 is shown with a conductor housing, etc., installed in it but normally all slots would be used.

In the left hand slot 2 in FIG. 2, a conductor housing 3 is installed, with conductor attached to it and extending down into the well 3. Installed within the conductor housing is a wellhead housing 7 from the lower end of which extends surface casing 6. Attached to the upper end of the wellhead housing is a riser 17 which, depending on the circumstances may or may not be present. If present, the riser would extend through the surface 18 of the sea to equipment on a producing platform (not shown). Lateral loads on the riser 17 are a source of stress on the wellhead and on the conductor and surface casing; these are measured with the strain gauges 10, 11 at the position where normally the highest and most critical loads are located.

A seabed receiver 19 is shown adjacent the template. The seabed receiver incorporates a unit 20 for receiving data by radio signals from the strain gauges 10, 11. This may be stored in a digital memory 21 and transmitted by a radio transmitter 22 to a platform receiver 23 on a nearby platform 24. Alternatively, a remotely operated unmanned vehicle 25 may be used to interrogate the seabed receiver 19, in which case the vehicle 25 would be provided with some means 26, e.g. a short range radio receiver, to received data from the seabed receiver 19 and to store it in digital memory 27 until it can be downloaded.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. GB2402478A
2. GB2450409B

The invention claimed is:

1. A computer implemented method for determining accumulated fatigue in subsea wellhead assembly installed in a subsea template while drilling with a mobile drilling unit and marine riser connected to the wellhead assembly, the method comprising:
   providing a subsea template having at least two template slots;
   providing a subsea wellhead assembly comprising a wellhead and associated tubing, the associated tubing including a conductor housing mounted to one of said template slots, a conductor mounted to said conductor housing and a surface casing, wherein said conductor housing is of larger diameter than said conductor and wherein said conductor housing is supported in said template slot by means of co-operating shoulder formations on said template slot and said conductor housing, and wherein said conductor is welded to said conductor housing;
   mounting between 10 and 20 strain gauges on the conductor at a location immediately below said conductor housing and mounting between 10 and 20 strain gauges on the surface casing at a location immediately below the wellhead, said locations of strain gauges on the conductor and surface casing being locations where normally the highest and most critical loads arise from lateral loads on the riser connected to the wellhead assembly, said strain gauges being evenly spaced around the circumference of the conductor and surface casing respectively, wherein the strain gauges are of a type capable of measuring 1 micro-strain at 10 Hz or better;
   by means of said strain gauges, measuring deformation of each of the conductor and surface casing;
   gathering strain data from the strain gauges over a period of time;
   using the gathered strain data, by means of a suitably programmed computer modelling stresses on the wellhead assembly, determining the number and magnitude of stress cycles of the wellhead assembly over the period of time, and calculating accumulated fatigue damage in the worst direction; and
   adjusting operating envelopes for the mobile drilling unit and riser tension to ensure design limits are not exceeded and conducting operations with said adjusted operating envelopes.

2. The method as claimed in claim 1, wherein one or more additional strain gauges are fitted adjacent or immediately below the top of the wellhead housing, conductor, or casing.

3. The method as claimed in claim 1, wherein at least one strain gauge is fitted to a further tubing string inside the surface casing.

4. The method as claimed in claim 1, further comprising a non-intrusive data transmission system to transmit data from strain gauges by radio, magnetic, electromagnetic, induction, or acoustic, such that no wire passes through any well tubing or seal.

5. The method as claimed in claim 4, wherein a data receiving unit is mounted on or adjacent to the wellhead, receives data from one or more of the strain gauges, and either (i) transmits the data to the surface or (ii) stores the data in a data storage facility from which it is periodically downloaded.

6. The method as claimed in claim 4 including powering the non-intrusive data transmission system by electric batteries, induction, or a combination of batteries and induction.

7. The method as claimed in claim 1, wherein at least some of the strain data is caused by movement of a riser or blowout preventer (BOP) connected to the wellhead.

8. The method as claimed in claim 1, including gathering data during a drilling, completion, stimulation, or workover operation.

9. The method as claimed in claim 7, wherein the riser is connected between the wellhead and a jack up rig, floating rig, drilling rig, or other structure.

10. A system for determining accumulated fatigue while drilling with a mobile drilling unit and marine riser connected to a subsea wellhead assembly installed in a subsea template having at least two template slots and defining appropriate operating envelopes for the mobile drilling unit and riser tension to ensure design limits are not exceeded, the system including the subsea wellhead assembly installed in said template, wherein the assembly includes a conductor housing mounted to one of said template slots, conductor mounted to said conductor housing, wellhead, and surface casing, wherein said conductor housing is of larger diameter than said conductor and wherein said conductor housing is supported in said template slot by means of co-operating shoulder formations on said template slot and said conductor housing, and wherein said conductor is welded to said conductor housing, the subsea wellhead assembly further including:

between 10 and 20 strain gauges mounted to the conductor at a location immediately below said conductor housing and between 10 and 20 strain gauges mounted to the surface casing at a location immediately below the wellhead, said locations of strain gauges on the conductor and surface casing being locations where normally the highest and most critical loads arise from lateral loads on a riser connected to the wellhead assembly, said strain gauges being evenly spaced around the circumference of the conductor and surface casing respectively, wherein said strain gauges are arranged to measure deformation of each of the conductor and surface casing and are of a type capable of measuring 1 micro-strain at 10 Hz or better;

a data transmission system to transmit data from strain gauges;

a data receiving unit adjacent the wellhead arranged to receive data from the strain gauges and to either (i) transmit the data to the surface or (ii) store the data in a data storage facility from which it is downloadable; and a computer implemented system for monitoring the received strain data and for modelling stresses on the wellhead assembly, and calculating accumulated fatigue in the worst direction.

11. The subsea wellhead assembly as claimed in claim 10, wherein one or more additional strain gauges are fitted adjacent or immediately below the top of the wellhead assembly, wellhead, conductor housing, casing, or a combination thereof.

12. The subsea wellhead assembly as claimed in claim 10, wherein at least one strain gauge is fitted to a further tubing string inside the surface casing.

13. The subsea wellhead assembly as claimed in claim 10, wherein a riser or blowout preventer (BOP) is connected to the wellhead.

14. The subsea wellhead assembly as claimed in claim 13, wherein said riser is connected between the wellhead and a jack up rig, floating rig, drilling rig, or other structure.

15. The subsea wellhead assembly as claimed in claim 10, wherein the non-intrusive data transmission system is powered by electric batteries, induction, or a combination of batteries and induction.

16. The subsea wellhead assembly as claimed in claim 10, wherein said non-intrusive data transmission system transmits data by radio, magnetic, electromagnetic, induction or acoustic transmission, such that no wire passes through any well tubing or seal.

* * * * *